L. L. Hines.
Well Tube.
N° 87,775.   Patented Mar. 16, 1869.

Witnesses
J. H. Shumway
A. J. Tibbits

Inventor
L. L. Hines
By his Attorney
John E. Earle

L. L. HIMES, OF NEW HAVEN, CONNECTICUT.

Letters Patent No. 87,775, dated March 16, 1869.

IMPROVEMENT IN WELL-TUBES.

The Schedule referred to in these Letters Patent and making part of the same.

*To all whom it may concern:*

Be it known that I, L. L. HIMES, of New Haven, in the county of New Haven, and State of Connecticut, have invented a new Improvement in Tubular Wells; and I do hereby declare the following, when taken in connection with the accompanying drawings, and the letters of reference marked thereon, to be a full, clear, and exact description of the same, and which said drawings constitute part of this specification, and represent, in—

Figure 1:
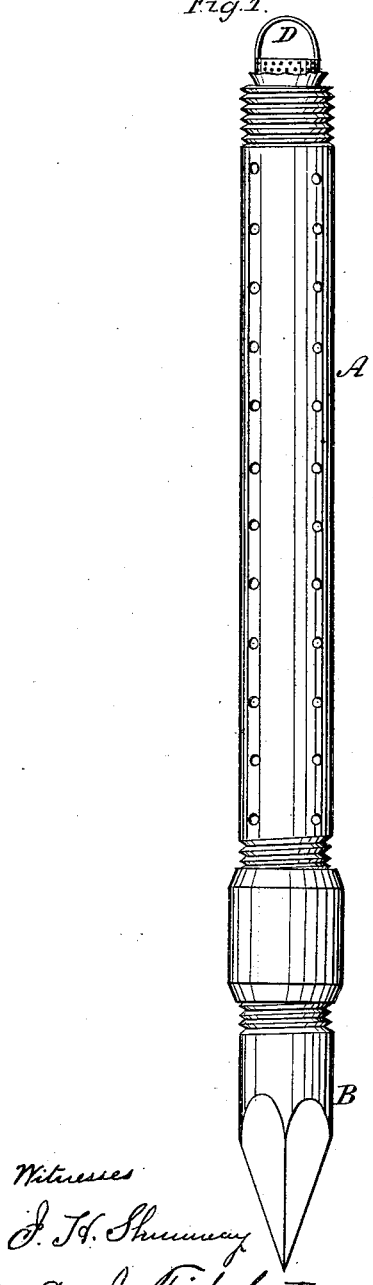
Figure 2:
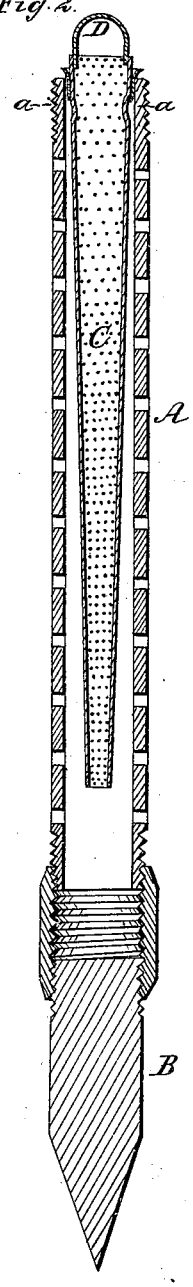

Figure 1, a side view,

Figure 2, a vertical central section, and in

Figure 3:
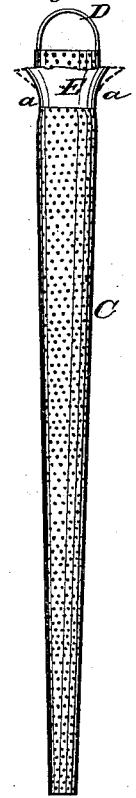

Figure 3, a side view of the strainer detached from the tube.

This invention relates to an improvement in the construction of tubular wells, that is to say, wells formed by driving the tube into the earth; and The invention consists in forming a conical perforated filter, which is fitted, inverted, into the lower part of the tube, and contracted at the neck, or larger end, so that by placing a ring of rubber packing around the said neck, it will serve to both pack the filter, and also to hold it in position, so that it cannot be raised by the action of the pump, but yet so that by attaching a hook to a bail formed on the top of the filter, the filter may be drawn from the tube, for the purpose of cleaning, &c.

To enable others to make and use my invention, I will fully describe the same as illustrated in the accompanying drawings.

A is the lower or perforated section of a common well-tube, provided with a point, B, to facilitate the driving of the tube into the earth.

C is the filter, shown detached in fig. 3, which is an inverted cone, finely perforated, so as to prevent the passage of any foreign substance into the tube above.

Near the upper end the filter is contracted, as at *a*, (see figs. 2 and 3,) and over the tube, into this neck, is placed a ring of rubber, E, cut from a thin sheet, so that when placed upon the filter, as in fig. 3, the outer edge of the ring will be turned up, while the inner end binds closely into the contracted portion of the filter, and upon the larger end of the filter a bail, D, is fixed, which completes the filter.

After the tube has been driven to the required depth, then insert the filter into the tube, and press it down until into its proper position, as in fig. 2. The upper edge of the packing gathers closely around, and so as to pack the filter in the tube; therefore any tendency to raise the filter causes the upper edge of the packing to cling to the inner surface of the tube, and prevents the raising of the filter by the action of the pump; but when it is desirable to raise the filter from the pump, insert a hooked rod into the tube, so as to catch the bail of the filter, then the filter may be drawn from the tube, cleaned, and replaced.

I do not claim an inverted conical perforated filter for tubular wells; but having fully described my invention, What I do claim as new and useful, and desire to secure by Letters Patent, is—

An inverted perforated conical filter, contracted near its larger end, so as to receive the packing E, and provided with the bail D, so as to operate substantially in the manner herein set forth.

L. L. HIMES.

Witnesses:
JOHN E. EARLE,
J. H. SHUMWAY.